United States Patent Office 2,745,845
Patented May 15, 1956

2,745,845

1-FORMYL-2-DIALKOXYMETHYL-SUCCINIC ACID ESTERS AND THEIR CYCLIZATION TO HETEROCYCLIC COMPOUNDS

Reuben G. Jones and Edmund C. Kornfeld, Indianapolis, Ind., assignors to Eli Lilly and Company, Indianapolis, Ind., a corporation of Indiana No Drawing. Application June 30, 1950,
Serial No. 171,555

9 Claims. (Cl. 260—347.3)

This invention relates to new chemical compounds and to their preparation, and more particularly to certain 5-membered heterocyclic compounds, to novel substituted succinic compounds cyclized to form the said heterocyclic compounds, and to the synthetic methods employed in producing the succinic and heterocyclic compounds.

The compounds and processes of this invention are illustrated by the following formulas, in which R represents an esterifying radical, and $R_1$ represents a lower alkyl radical.

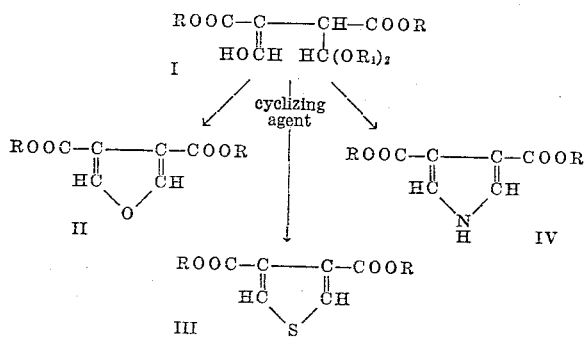

As will be seen from the above formulas, a 1-formyl-2-dialkoxymethyl succinic acid ester is converted into a 3,4-dicarboxy-substituted furan, thiophene or pyrrole by an easily performed process step which comprises cyclizing the succinic acid ester with a cyclizing agent the choice of which is dependent upon the type of heterocyclic ring to be prepared.

In the case of the dicarboxy-substituted furan compounds, the acid and certain of its esters are known compounds, but the thiophene and pyrrole acids and esters are new. These latter compounds have special fields of utility. Thus for example, they can be usefully employed as intermediates in organic chemical synthesis. The thiophenes are useful in the synthesis of substances having biotin or antibiotin activity, and the pyrroles have utility in the synthesis of compounds of the character of hemin and chlorophyll.

To illustrate the excellence of the synthesis of the heterocyclic compounds disclosed herein, reference is made to the methods of preparation of furan compounds previously known to the art, as exemplified by the publications of Reichstein et al. [Helv.Chim.Acta. 16, 276 (1933)], and Alder et al. [Ber der Deut.Chem.Geseli. 70B, 1354 (1937)]. The methods of those published articles required starting materials which are expensive and difficult to obtain. Moreover, the synthetic methods themselves are inconvenient and difficult to carry out. In sharp contrast thereto, the synthetic methods provided by the present invention are easily carried out with simple and readily available starting materials.

The key to the successful synthesis of the above-defined heterocyclic compounds resides in the provision of a new ester, a 1-formly-2-dialkoxymethyl succinic acid ester. This new style of ester is represented by the following formula

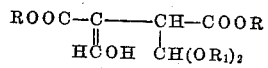

in which R and $R_1$ have the same significance as given hereinabove.

The 1-formyl-2-dialkoxymethyl succinic acid ester is obtained by either of two methods: (1) A dialkylformyl succinic acid ester is converted to a dialkyl-dialkoxymethyl succinic acid ester by reacting the former with an alkylorthoformate, and the dialkoxy compound is formylated with an alkylformate in the presence of an alkali; (2) a dialkylformyl succinic acid ester is reacted with an alcohol in the presence of an acid catalyst to obtain a dialkyl-dialkoxymethyl succinic acid ester which is formylated as in method 1 above.

The 1-formyl-2-dialkoxymethyl succinic acid ester can have as esterifying groups any of the esterifying groups commonly employed for such purposes. For reasons of convenience and economy, it is preferable to employ lower alkyl radicals as esterifying groups. It will be obvious to those skilled in the art that should other esterifying groups be employed they should not contain groups e. g., —OH, —NH$_2$, etc., which would interfere with the desired condensation reaction.

The alkylorthoformate employed can be any convenient and readily available alkylorthoformate, examples of such being methyl, ethyl, propyl, etc., orthoformates.

In the course of the preparation of the diethyl-1-formyl-2-dialkoxymethyl succinic acid esters there is a possibility of ester exchange when the esterifying group of the alkylethylformate differs from that of the succinic acid diester. Accordingly, when it is desired to produce directly a 3,4-heterocyclic dicarboxylic acid ester which unquestionably contains the desired esterifying radicals on the carboxy groups, the alkyl orthoformate employed in the synthesis of the intermediate succinic acid ester should contain the same esterifying radical as that contained in the succinic acid diester. However, when the compound to be produced is to be the dicarboxy acid the precautions against ester exchange can be disregarded.

The cyclizing agent to be used in combination with the dialkoxymethyl succinic acid ester to produce the 3,4-dicarboxy-substituted heterocyclic compound is an acidic cyclizing agent and is chosen with respect to its ability to cause (A) a simple cyclization of the succinic acid ester, in which case the furan heterocyclic compound is produced; or (B) its ability to cause simultaneous cyclization and substitution, in which case a thiophene or pyrrole heterocyclic compound is produced. Suitable cyclizing agents capable of producing the furan heterocyclic compound include agents such as sulfuric acid, phosphoric acid, phosphorus oxychloride, hydrogen chloride, boron trifluoride, zinc chloride, and the like. Cyclizing agents which cause cyclization and substitution to produce a thiophene compound include phosphorus pentasulfide and the like. Cyclizing agents which cause simultaneous cyclization and substitution to produce a pyrrole compound include agents such as ammonium chloride, ammonium acetate and other like ammonium-containing agents.

The heterocyclicdicarboxylic acid diesters thus prepared are readily hydrolyzed by the common methods of the art to produce 3,4-heterocyclicdicarboxylic acids. Suitable hydrolytic methods include treating the esters with aqueous alkali, followed by acidification and recovery of the free acid, and the like. The 3,4-heterocyclicdicarboxylic acids thus obtained can be re-esterified by customary esterifying methods well known to the art to produce other esters.

The following examples illustrate the preparation of certain of the novel compounds of this invention and the processes employed in producing them.

EXAMPLE 1

*Preparation of diethyl 1-formyl-2-diethoxymethyl-succinate*

A mixture of 700 g. (4.0 mols) of diethyl succinate and 370 g. (5.0 mols) of ethyl formate was added to a well-stirred suspension of 100 g. (4.3 mols) of finely divided sodium in 2 liters of anhydrous ether. The reaction mixture was allowed to stand overnight at room temperature, and then 1.5 liters of ice water were added. The aqueous layer was separated from the ether layer and acidified with cold 12 N sulfuric acid, whereupon diethyl formylsuccinate separated as an oil. The aqueous layer was removed and extracted with 500 cc. of ether to extract an additional amount of diethyl formylsuccinate, and the ether extract and the oily diethyl formylsuccinate were combined, dried with anhydrous magnesium sulfate, and distilled. The fraction boiling at 120–135° C. at 10 mm. pressure, comprising diethyl formylsuccinate, was collected.

A mixture of 1100 g. (5.4 mols) of diethyl formylsuccinate, 850 g. (5.75 mols) of ethyl orthoformate and 350 cc. of absolute alcohol was prepared. To the mixture were added 3 drops of concentrated sulfuric acid, whereupon the reaction was initiated as evidenced by the spontaneous warming of the mixture. The reaction mixture was then heated on the steam bath for 3 hours, while allowing ethyl formate and ethanol, the volatile products of the reaction, to distill out. The residue was distilled under reduced pressure and the fraction boiling at 110–114° C. at 0.5 mm., comprising diethyl diethoxymethylsuccinate, was collected.

1260 g. of diethyl diethoxymethylsuccinate, a yield of 85 percent of theoretical, were obtained having $$n_D^{25} = 1.4303$$

and $$d_{20}^{20} = 1.042$$

Analysis showed the presence of 56.09 percent carbon and 9.07 percent hydrogen, as compared with the calculated amounts of 56.50 percent carbon and 8.75 percent hydrogen.

A mixture of 276 g. (1.0 mol) of diethyl diethoxymethylsuccinate and 95 g. (1.25 mol) of ethyl formate was added over a period of 1.5 hours to a well-stirred suspension of 26.5 g. (1.15 mol) of finely divided sodium in 500 cc. of anhydrous ether. When the addition was complete, the reaction mixture was allowed to stand at room temperature for 2 hours, and then 1 liter of ice water was added while stirring. The aqueous layer was separated, and was faintly acidified with cold dilute sulfuric acid, whereupon an oil comprising diethyl 1-formyl-2-diethoxymethylsuccinate separated. The oil was separated and the acid solution was extracted with two 200 cc. portions of ether. The ether extracts and the oil were combined, dried over anhydrous magnesium sulfate and distilled under vacuum on a steam bath to remove the ether. The residue, comprising 172 g. of diethyl 1-formyl-2-diethoxymethylsuccinate, or a yield of 89 percent of theory, was pure enough for cyclization, although for further purification the residue was distilled under vacuum, and the fraction distilling at 124° C. at 0.8 mm. pressure collected.

Diethyl 1-formyl-2-diethoxymethylsuccinate thus prepared and purified had $$n_D^{25} = 1.4682$$

and $$d_{20}^{20} = 1.115$$

Analysis showed the presence of 54.82 percent carbon and 7.48 percent hydrogen as compared with the calculated amounts of 55.25 percent carbon and 7.95 percent hydrogen.

EXAMPLE 2

*Preparation of diethyl 3,4-furandicarboxylate*

165 g. of diethyl 1-formyl-2-diethoxymethylsuccinate were added dropwise with stirring over a 5-minute period to 330 cc. of concentrated sulfuric acid. The reaction mixture was maintained at 48–52° C. by periodic cooling. The mixture was kept at 50° C. for an additional 5 minutes, after which it was cooled rapidly to 0° C. and then poured over a slight excess of crushed ice. The cold solution was extracted with six 250 cc. portions of ether. The extracts were combined, washed with 300 cc. of ice cold 3 N sodium hydroxide solution, dried over anhydrous magnesium sulfate and fractionally distilled. The fraction boiling at 125–127° C. at 6 mm. pressure and comprising diethyl 3,4-furandicarboxylate was collected. 78 g., a yield of 68 percent of theory, of diethyl 3,4-furandicarboxylate having $n_D^{25} = 1.860$ were recovered. Analysis showed the presence of 56.16 percent carbon and 6.17 percent hydrogen as compared with the calculated amounts of 56.60 percent carbon and 5.70 percent hydrogen.

EXAMPLE 3

The process of Example 2 was repeated, except that the cyclization was carried out using phosphorus oxychloride, and the reaction temperature was maintained at about 100° C. A 30 percent yield of diethyl 3,4-furandicarboxylate was obtained.

EXAMPLE 4

The process of Example 3 was repeated, except that liquid hydrogen fluoride was used as the cyclizing agent and the reaction mixture was maintained at room temperature for 60 minutes.

A 40 percent yield of diethyl 3,4-furandicarboxylate was obtained.

EXAMPLE 5

The process of Example 2 was repeated, except that the cyclization was carried out using zinc chloride suspended in benzene as a cyclizing agent, and the reaction mixture was refluxed for 1 hour.

A 43 percent yield of diethyl 3,4-furandicarboxylate was obtained.

EXAMPLE 6

The process of Example 2 was repeated except that cyclizations were accomplished through the use of syrupy phosphoric acid at a reaction temperature of 55 to 85° C., and through the use of a benzene solution of boron trifluoride, refluxing being carried out in each case for about 2 hours. Somewhat lower yields of diethyl 3,4-furandicarboxylate were obtained in these runs.

EXAMPLE 7

*Preparation of dimethyl 1-formyl-2-dimethoxymethylsuccinate*

180 g. of sodium methoxide were suspended in 1.5 liters of anhydrous ether in a flask fitted with a reflux condenser, and a mixture of 454 g. of dimethylsuccinate and 250 g. of methyl formate was added dropwise, while stirring, over a period of about one hour. Stirring was continued for an additional 3-hour period, after which the reaction mixture was allowed to stand for 12 to 16 hours. 600 cc. of ice water were then added with stirring and the aqueous phase was separated and acidified with cold dilute sulfuric acid. The dimethyl formylsuccinate formed in the reaction was extracted from the acidified aqueous solution with two 750 cc. portions of ether. The combined ether extracts were washed with water, and dried over anhydrous magnesium sulfate. The ether was then evaporated in vacuo, and the residue distilled under reduced pressure.

Dimethyl formylsuccinate thus prepared boiled at about 120–125° C. at a pressure of 8 mm. of Hg. A yield of 49 percent of theory was obtained.

265 g. of methylformylsuccinate prepared as outlined above were added to a solution of 100 g. of hydrogen chloride in 1 liter of absolute methanol. The mixture was allowed to stand at room temperature for about 18 hours and then the solvent was removed completely in vacuo. The residue, comprising the dimethylacetal of methyl formylsuccinate, or dimethyl 1-dimethoxymethylsuccinate, was dissolved in 600 cc. of ether and washed with 5 percent aqueous sodium bicarbonate solution, followed by 25 cc. of cold 2.5 percent aqueous sodium hydroxide, to remove any unreacted dimethylformylsuccinate. The washed ether solution was dried over anhydrous magnesium sulfate, the ether was removed in vacuo and the residue was fractionally distilled under reduced pressure.

Dimethyl 1-dimethoxymethylsuccinate thus prepared boiled at 125–130° C. at a pressure of 6 mm. of mercury and had $n_D^{25}=1.4315$. A yield of 206 g., or 62 percent of theoretical, was obtained. Analysis showed the presence of 49.08 percent carbon and 7.33 percent hydrogen as compared with the calculated amounts of 49.08 percent carbon and 7.32 percent hydrogen.

To a suspension of 60 g. of sodium methylate in 1 liter of absolute ether, contained in a flask equipped with a reflux condenser, was added a mixture of 206 g. of dimethyl 1-dimethoxymethylsuccinate and 150 g. of methyl formate. The mixture was added dropwise while stirring, over a period of about 1 hour. Stirring was continued for about 3 hours, after which the reaction mixture was permitted to stand at room temperature for 3 days. 400 cc. of ice water were then added, the mixture was well stirred, and the aqueous layer which formed thereafter was separated off. The aqueous solution was then acidified with cold dilute sulfuric acid and extracted with two 300 cc. portions of ether. The combined ether extracts were dried over anhydrous magnesium sulfate. The ether was removed by evaporation in vacuo, leaving a residue comprising dimethyl 1-formyl-2-dimethoxymethylsuccinate, which was purified by fractional distillation.

Dimethyl 1-formyl-2-dimethoxymethylsuccinate thus prepared boiled at about 125–130° C. at a pressure of 0.5 mm. of mercury and had $n_D^{25}=1.4752$. Analysis showed the presence of 48.07 percent carbon and 5.61 percent hydrogen as compared with the calculated amounts of 48.38 percent carbon and 6.50 percent hydrogen. 113 g. of material satisfactorily pure for cyclization without distillation, or a yield of 48 percent of theory, were obtained.

EXAMPLE 8

*Preparation of diethyl 3,4-thiophenedicarboxylate*

100 g. of diethyl 1-formyl-2-diethoxymethylsuccinate, prepared according to the procedure of Example 1, were mixed with 100 g. of phosphorus pentasulfide and 1 liter of dry toluene. The mixture was refluxed for about 2 hours, and then allowed to stand overnight at room temperature. The resulting dark-colored solution was decanted from the insoluble material and washed well with successive quantities of water, aqueous saturated sodium bicarbonate and cold 5 percent sodium hydroxide solution. The toluene solution was dried over magnesium sulfate, and fractionally distilled in vacuo. After removal of the toluene, the portion which distilled off, comprising diethyl 3,4-thiophenedicarboxylate, was collected.

Diethyl 3,4-thiophenedicarboxylate thus prepared boiled at about 118–130° C. at a pressure of 1 mm. of mercury.

EXAMPLE 9

*Preparation of 3,4-thiophenedicarboxylic acid*

The diethyl 3,4-thiophene dicarboxylate prepared by the process of Example 8 was refluxed for 20 hours in a solution composed of 10 cc. of ethanol, 40 cc. of 12 N aqueous sodium hydroxide and 50 cc. of water. The reaction mixture was treated with activated carbon and was then acidified with concentrated hydrochloric acid. The 3,4-thiophenedicarboxylic acid formed in the reaction thereupon precipitated and was filtered off, washed well with water, and recrystallized from hot water for purification.

3,4-thiophenedicarboxylic acid thus prepared melted at about 225–226° C. Analysis showed the presence of 41.80 percent carbon and 2.44 percent hydrogen as compared with the calculated amounts of 41.86 percent carbon and 2.34 percent hydrogen.

EXAMPLE 10

*Preparation of diethyl 3,4-pyrroledicarboxylate*

To 60.8 g. of diethyl 1-formyl-2-diethoxymethylsuccinate, prepared according to the method of Example 1, were added 75 g. of ammonium acetate, 5 g. of ammonium chloride, 150 cc. of acetic acid, and 5 cc. of water. The mixture was refluxed for 1 hour, and then the volatile portion was removed by distillation in vacuo. The residue, comprising diethyl 3,4-pyrroledicarboxylate, was taken up in 500 cc. of ether. The ether solution was washed first with water, and then with 200 cc. of ice-cold 5 percent sodium hydroxide solution. The ether solution was dried over anhydrous magnesium sulfate, and the ether was distilled off. The residue was recrystallized from dilute ethanol.

Diethyl 3,4-pyrroledicarboxylate thus prepared melted at about 153–154° C. Analysis showed the presence of 6.60 percent nitrogen as compared with the calculated amount of 6.63 percent.

EXAMPLE 11

Diethyl 3,4-pyrroledicarboxylate was also prepared as follows: 55.5 g. of diethyl 1-formyl-2-diethoxymethylsuccinate were dissolved in 75 cc. of ether and a solution of 4 g. of ammonia in 25 cc. of ethanol was added. The solvents were then removed completely in vacuo and the syrupy residue was added gradually and with stirring to 110 cc. of concentrated sulfuric acid. The temperature of the reaction mixture during this addition was kept at 45° C. The mixture was then poured over cracked ice, whereupon crystals of diethyl 3,4-pyrroledicarboxylate formed. The product was filtered off and washed with water, ethanol and ether.

Diethyl 3,4-pyrroledicarboxylate thus prepared melted at about 153–154° C. 18.9 g., a yield of 49 percent of theory, were recovered.

EXAMPLE 12

*Preparation of dimethyl 3,4-furandicarboxylate*

55 g. of dimethyl 1-formyl-2-dimethoxymethylsuccinate, prepared according to the process of Example 7, were added in the course of 2 to 3 minutes to 110 cc. of concentrated sulfuric acid, while stirring and keeping the temperature of the reaction mixture below 45° by cooling. The mixture was kept at 45° C. for a further 5 minutes, after which the solution was poured onto 500 g. of crushed ice. A crystalline precipitate, comprising dimethyl 3,4-furandicarboxylate was formed. The precipitate was filtered off and washed well with successive portions of cold water, saturated aqueous sodium bicarbonate, and water. On drying, the precipitate was purified by recrystallization from an ether-petroleum ether mixture.

Dimethyl 3,4-furandicarboxylate thus prepared melted at about 49–51° C. and a yield of 27 g., or 66 percent of theory was obtained. Analysis showed the presence of 52.15 percent carbon and 4.87 percent hydrogen as compared with the calculated amounts of 52.18 percent carbon and 4.38 percent hydrogen.

EXAMPLE 13

*Preparation of 3,4-furandicarboxylic acid*

141 g. of diethyl 3,4-furandicarboxylate were dissolved in 700 cc. of ethanol, and a solution of 141 g. of potassium hydroxide in 141 cc. of water was gradually added. The resulting mixture was refluxed for 1 hour, following which the alcohol was distilled off in vacuo. The residue was taken up in water and acidified by adding 210 cc. of concentrated hydrochloric acid, while cooling the reaction mixture in ice. The precipitated 3,4-furandicarboxylic acid was filtered off, washed with water, and dried.

100.2 g. of furandicarboxylic acid, melting at about 221.5–222.5° C. on recrystallization from ether-petroleum ether, were recovered. The yield was 96 percent of theoretical.

EXAMPLE 14

1.5 g. of diethyl-3,4-pyrroledicarboxylate were refluxed for about 21 hours in a solution of 3 g. of sodium hydroxide and 30 ml. of dilute aqueous ethanol. The ethanol was removed in vacuo and the acqueous solution cooled and acidified with 7 cc. of concentrated hydrochloric acid. The 3,4-pyrrole dicarboxylic acid which precipitated was filtered off and washed with water. It was purified by reprecipitating it from a dilute alkaline solution with dilute hydrochloric acid. The purified 3,4-pyrrole dicarboxylic acid melted at about 290-292° C. (dec.).

Analysis showed the presence of 46.73 percent carbon, 3.30 percent hydrogen and 9.11 percent nitrogen as compared with the calculated amounts of 46.46 percent carbon, 3.25 percent hydrogen and 9.03 percent nitrogen.

EXAMPLE 15

The process of Example 1 is repeated, except that dipropyl succinate and propyl formate are used in place of diethyl succinate and ethyl formate. In this way dipropyl 1-formyl-2-dipropoxymethylsuccinate is prepared.

Likewise, the process of Example 1 is repeated using dibutylsuccinate and butyl formate in place of diethylsuccinate and ethyl formate. In the same manner, dibutyl 1-formyl-2-dibutoxymethylsuccinate is formed and isolated.

EXAMPLE 16

The dipropyl 1-formyl-2-dipropoxymethylsuccinate and the dibutyl 1-formyl-2-dipropoxymethylsuccinate prepared in the previous example are each subjected to the action of concentrated sulfuric acid as set forth in Example 2.

Dipropyl 3,4-furandicarboxylate and dibutyl 3,4-furandicarboxylate, respectively, are formed.

EXAMPLE 17

The dipropyl 1-formyl-2-dipropoxymethylsuccinate and dibutyl 1-formyl-2-dibutoxymethylsuccinate prepared in Example 14 are each treated with phosphorus pentasulfide according to the method of Example 8.

Dipropyl 3,4-thiophenedicarboxylate, and dibutyl 3,4-thiophenedicarboxylate, respectively, are formed.

EXAMPLE 18

The dipropyl 1-formyl-2-dipropoxymethylsuccinate and dibutyl 1-formyl-2-dibutoxymethylsuccinate prepared in Example 14 are each cyclized with a mixture of ammonium chloride and ammonium acetate, in acetic acid solution according to the method of Example 10.

Dipropyl 3,4-pyrrole dicarboxylate and dibutyl 3,4-pyrroledicarboxylate, respectively, are formed.

We claim:

1. The process which comprises treating a 1-formyl-2-dialkoxymethylsuccinic acid ester of the following formula

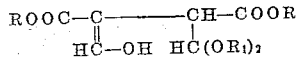

in which R and R₁ represent lower alkyl radicals, with an acidic dehydrating agent to cyclize the said ester and to produce a compound having the formula

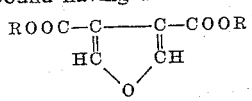

wherein R has the same significance as before.

2. The process which comprises heating a 1-formyl-2-dialkoxymethylsuccinic acid ester of the formula

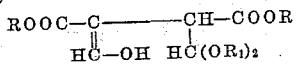

in which R and R₁ represent lower alkyl radicals, with an acidic dehydrating agent, and hydrolyzing the ester groups of said compound to produce a compound having the formula

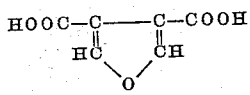

3. The process of preparing a compound represented by the formula

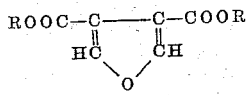

wherein R represent a lower alkyl radical, which comprises formylating a dialkoxymethylsuccinic acid ester to produce a 1-formyl-2-dialkoxymethylsuccinic acid ester having the formula

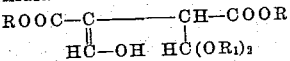

wherein R has the same significance as before and R₁ is a lower alkyl radical, and cyclizing the said formyl compound by treating it with an acidic dehydrating agent.

4. The process according to claim 1 in which the cyclizing agent is sulfuric acid.

5. The process according to claim 1 in which the cyclizing agent is zinc chloride.

6. A process of preparing 3,4-furandicarboxylic acid which comprises the steps of treating a dialkylformylsuccinic acid ester with ethyl-o-formate to produce diethyl dialkoxymethylsuccinate, formylating the diethyl dialkoxymethylsuccinate, cyclizing the resulting diethyl-1-formyl-2-dialkoxymethylsuccinate by treatment with an acidic dehydrating agent, and hydrolyzing the diethyl-3,4-furandicarboxylate which is produced.

7. The compound represented by the formula

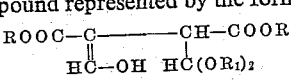

in which R and R₁ each represents a lower alkyl radical.

8. The compound represented by the formula

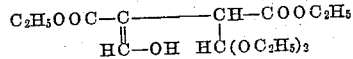

9. The compound represented by the formula

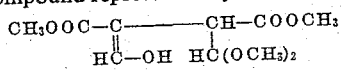

References Cited in the file of this patent

UNITED STATES PATENTS

| | | |
|---|---|---|
| 2,453,676 | Sickels | Nov. 9, 1948 |
| 2,506,536 | Barker | May 2, 1950 |
| 2,535,011 | Croxall | Dec. 19, 1950 |
| 2,552,978 | Kreuz | May 15, 1951 |
| 2,562,238 | Lukasiewicz et al. | July 31, 1951 |
| 2,630,437 | Homeyer | Mar. 3, 1953 |
| 2,641,601 | Goldberg et al. | June 9, 1953 |
| 2,648,685 | Reppe et al. | Aug. 11, 1953 |
| 2,651,639 | Angier | Sept. 8, 1953 |

FOREIGN PATENTS

| | | |
|---|---|---|
| 235,939 | Switzerland | May 16, 1945 |
| 594,697 | Great Britain | Nov. 18, 1947 |

OTHER REFERENCES

Knorr: Berichte, vol. 18 (1885), pp. 299–311.
Wright: Ind. and Eng. Chem., vol. 40 pp. 1517–22.
Beilstein: Handbuch der Organischen Chemie, vol. 18, p. 327 bottom.